United States Patent
Prakah-Asante et al.

(10) Patent No.: US 7,236,865 B2
(45) Date of Patent: Jun. 26, 2007

(54) ACTIVE ADAPTATION OF VEHICLE RESTRAINTS FOR ENHANCED PERFORMANCE ROBUSTNESS

(75) Inventors: Kwaku O. Prakah-Asante, Commerce Township, MI (US); Manoharprasad K. Rao, Novi, MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 547 days.

(21) Appl. No.: 10/935,926

(22) Filed: Sep. 8, 2004

(65) Prior Publication Data

US 2006/0052924 A1 Mar. 9, 2006

(51) Int. Cl.
- B60R 21/015 (2006.01)
- G08G 1/16 (2006.01)
- G06F 19/00 (2006.01)

(52) U.S. Cl. .......................... 701/45; 701/46; 701/96; 701/301; 280/735; 180/271; 340/436

(58) Field of Classification Search .................. 701/45, 701/46, 93, 96, 300, 301; 340/436, 438, 340/439, 903; 280/735; 180/271
See application file for complete search history.

(56) References Cited

U.S. PATENT DOCUMENTS

| | | | |
|---|---|---|---|
| 5,900,677 A | 5/1999 | Musiol et al. | |
| 5,969,599 A | 10/1999 | Wessels et al. | |
| 5,997,033 A | 12/1999 | Gray et al. | |
| 6,085,151 A * | 7/2000 | Farmer et al. | 701/301 |
| 6,087,928 A * | 7/2000 | Kleinberg et al. | 340/436 |
| 6,109,648 A | 8/2000 | Luo et al. | |
| 6,186,539 B1 * | 2/2001 | Foo et al. | 280/735 |
| 6,199,906 B1 | 3/2001 | Trevillyan et al. | |
| 6,219,606 B1 | 4/2001 | Wessels et al. | |
| 6,296,273 B1 | 10/2001 | Lewallen et al. | |
| 6,325,414 B2 | 12/2001 | Breed et al. | |
| 6,330,500 B1 | 12/2001 | Moriyama et al. | |
| 6,341,252 B1 | 1/2002 | Foo et al. | |
| 7,188,012 B2 * | 3/2007 | Salmeen et al. | 701/45 |

FOREIGN PATENT DOCUMENTS

EP 1 208 021 B1 10/2003

\* cited by examiner

*Primary Examiner*—Tan Q. Nguyen
(74) *Attorney, Agent, or Firm*—Frank MacKenzie; Artz & Artz, P.C.

(57) ABSTRACT

A vehicle crash safety system includes a pre-crash sensing system generating an object threat assessment and vehicle dynamics data, an occupant sensing system generating occupant characteristic data, and an Occupant Safety Reference Model (OSRM) controller for generating a reference safety restraint deployment profile as a function of the object threat assessment, vehicle dynamics data and occupant characteristic data. An active restraint adaptation (ARA) controller in operative communication with the OSRM controller and a decentralized restraint controller. The ARA controller sends restraint deployment targets, and the safety restraint deployment profile to the decentralized restraint controller. The ARA controller may modify input signals to the decentralized controller based on the real-time occupant position trajectory. The decentralized restraint controller is adapted to operate the restraint system as a function of signals from the ARA controller and real-time occupant-restraint system interactions.

20 Claims, 5 Drawing Sheets

ACTIVE ADAPTATION OF VEHICLE RESTRAINTS FOR ENHANCED PERFORMANCE ROBUSTNESS

TECHNICAL FIELD

The present invention relates to vehicle crash safety systems for automotive vehicles, and more particularly, to vehicle crash safety systems having coordinated restraints operated with respect to a multi-variable occupant model for different occupants and crash types.

BACKGROUND OF THE INVENTION

Automobiles utilize safety restraint systems to protect vehicle occupants. Most vehicle safety systems are designed to mitigate potential injuries to occupants during vehicle crashes and, in particular, mitigate injuries to the chest, abdomen and head areas of vehicle occupants. Vehicle safety systems development has progressively targeted new methods for enhanced injury mitigation. For example, restraint systems may include safety devices such as front airbags, side airbags, and seatbelt pretensioners. Presently, restraint systems typically include passive accelerometer-based collision severity sensors, which are used to gather information for control and deployment of the restraints. The collision sensors are typically in the form of solid-state accelerometers that are located in a vehicle compartment, such as in a dashboard, in a tunnel location, behind a bumper, or on a radiator support. The accelerometers are used to detect collision conditions early on in a collision event and provide information related to the collision severity. Various algorithms are then utilized to evaluate the collision conditions and the collision severity for the development of safety systems.

The algorithms utilize accelerometer information, collected early in a collision event and in response to a collision, to determine timing for deployment of restraint systems. It is desirable in the deployment of the restraint systems to prevent inappropriate deployment timing or inadvertent deployment of the restraint systems. Thus, deployment thresholds are often set in response to the type of collision and the associated conditions thereof.

Special collision events such as low speed barrier collisions, pole collisions, and various vehicle-to-vehicle collisions provide the greatest challenges for collision sensor design, and collision type determination. The term "collision type" generally refers to the location on a host vehicle that is involved in the collision and may include other related information. A collision type may for example refer to whether a particular collision is a full-frontal, an oblique, or an offset collision, as well as include information related to relative location, and collision change in velocity of an object of concern.

Sensor and algorithm design criteria of a safety restraint system ensure that the performance of a sensing system satisfy timing requirements for various different collision types and also have the capability of appropriately maintaining safety systems in a deactivated state during non-deployment conditions. It is also desirable to optimize protection for various occupants while reducing restraint-induced injuries such as airbag related injuries. Further, it is desirable to improve restraint performance for a wider range of vehicle occupants such as those in the $5^{th}$, $50^{th}$, and $95^{th}$ percentile for vehicle occupants. There thus exists a need for improved methods to intelligently control the direction, localization and areas where the forces of vehicle safety restraints act on various vehicle occupants to enhance occupant safety. In particular, it would be desirable to actively analyze and adapt the occupant-safety restraint interaction during a crash event to improve injury mitigation.

SUMMARY OF THE INVENTION

The present invention provides a new method for active adaptation of vehicle restraint systems for occupant protection performance robustness. The method utilizes a multi-variable occupant model reference approach to meet safety performance specifications for different occupants and different crash types. The present system provides a decentralized control architecture with inputs from advisory components. The system makes use of both pre-crash sensory information and collision detection signals. The pre-crash sensing system provides such information as the closing velocities before impact and occupant characteristics which are used to predict desired occupant ride-down and injury mitigation outcomes before collision. After confirmation of a collision by the collision detection sensors, the dynamic occupant characteristics are monitored with an occupant position tracking system. The vehicle restraint systems are actively adapted based upon the pre-crash model and the dynamic occupant response after collision confirmation. For example, compensation is made to the airbag venting system to maintain the desired occupant ride-down profile. The compensation models are tailored to dissipate the kinetic energy of the occupants so that injuries can be avoided or effectively mitigated while tracking requirements from the adaptive occupant safety reference model.

In one embodiment, a vehicle crash safety system for an automotive vehicle is provided. The system includes a pre-crash sensing system generating an object threat assessment and vehicle dynamics data, an occupant sensing system generating occupant characteristic data, and an Occupant Safety Reference Model (OSRM) controller in electronic communication with the pre-crash sensing system and the occupant sensing system. The OSRM controller generates a reference safety restraint deployment profile as a function of the object threat assessment, vehicle dynamics data and occupant characteristic data. The system includes an Active Restraint Adaptation (ARA) controller in operative communication with the OSRM controller and a decentralized restraint controller. The ARA controller sends restraint deployment targets, and the reference safety restraint deployment profile to the decentralized restraint controller. In addition, the ARA controller performs plausibility checks for sensor reliability, and may modify input signals to the decentralized controller based on the real-time occupant and safety system interaction. The system also includes a restraint system under the control of the respective decentralized restraint controller. The restraint controller is in operative communication with the ARA controller and is adapted to operate the restraint system as a function of the reference safety restraint deployment profile. The decentralized restraint controller is programmed to track the reference safety restraint deployment profile during a crash event as a function of real-time occupant-restraint system interaction. The restraint system can be any one of a driver airbag system, a passenger airbag system, a side airbag system, a curtain airbag system, a seatbelt system, a deployable knee-bolster system, a deployable lower extremity protection system, a deployable steering system, or an occupant anti-submaring system. The airbag systems can be multi-stage, variable venting airbag systems. As an example, the reference safety restraint deployment profile can be a desired occupant ride-down profile.

In another aspect, a vehicle crash safety system for an automotive vehicle is disclosed. The system includes a pre-crash sensing system generating an object threat assessment, an occupant sensing system generating occupant characteristic data, and an Occupant Safety Reference Model (OSRM) controller in electronic communication with the pre-crash sensing system and the occupant sensing system. The OSRM controller generating a reference occupant ride-down profile as a function of the object threat assessment and occupant characteristic data. The system also includes a collision sensing system for signaling a crash event, and a multi-stage, variable venting airbag system under the control of a decentralized restraint controller. An Active Restraint Adaptation (ARA) controller is also in operative communication with the OSRM controller and the restraint controller. The ARA controller sends restraint deployment targets, and the reference safety restraint deployment profile to the decentralized restraint controller. The ARA controller also performs plausibility checks for sensor reliability, and may modify input signals to the decentralized controller based on the real-time occupant and safety system interaction. The restraint controller is programmed to track the reference occupant ride-down profile during the crash event as a function of real-time occupant-restraint system interaction. In particular, the restraint controller can modify at least one of airbag flow rate or venting rate, during said crash event, in response to a detected occupant head position with respect to the airbag.

In a further aspect of the invention, a method for operating a vehicle crash safety system for an automotive vehicle is disclosed. The method includes generating a pre-crash threat assessment signal and vehicle dynamics data from a pre-crash sensing system, generating occupant characteristic data from an occupant sensing system, and generating a reference safety restraint deployment profile as a function of the pre-crash signal, vehicle dynamics data and occupant characteristic data. This reference safety restraint deployment profile is communicated to an ARA. The ARA controller is also in communication with a respective decentralized control and is adapted to operate the restraint system as a function of the reference safety restraint deployment profile. In response to a crash event, the ARA controller modifies the restraint system response during the crash event as a function of real-time occupant-restraint system interaction. In one example, the restraint comprises a multi-stage airbag with variable venting, and the step of modifying includes monitoring, during the crash event, an occupant head position with respect to the vehicle interior and, in response to the occupant head position, adaptively controlling at least one of an inflation rate or venting rate.

The present invention presents a number of advantages. For instance, dynamic occupant outputs are tracked based on the reference occupant model, and deploy/no-deploy decisions for the restraint systems are coordinated. Further, the present system provides synchronized manipulation of multi-stage airbags based on the reference model for improved injury mitigation. Also, occupant injury mitigation targets are predicted by the occupant model to target optimum injury mitigation for a wide range of vehicle occupants. The restraint systems are manipulated accordingly and system performance is dynamically tracked to achieve desired results. By adaptively modifying the occupant ride-down profile, the system can potentially improve injury mitigation. Such enhanced restraints performance can improve occupant safety during collisions with incompatible collision partners. Furthermore, unique crash situations such as a pole crash are compensated for based on the occupant model characteristics. Furthermore, depending upon the magnitude of the crash, and the predicted type of crash, only certain restraints are deployed. System robustness is also improved by the use of a central advisory system which communicates information to the local de-centralized restraint control system for each particular restraint module.

Other advantages and features of the present invention will become apparent when viewed in light of the detailed description when taken in conjunction with the attached drawings and appended claims.

BRIEF DESCRIPTION OF THE DRAWINGS

For a more complete understanding of this invention reference should now be made to the embodiments illustrated in greater detail in the accompanying figures and described below by way of examples of the invention wherein.

DETAILED DESCRIPTION

In the following figures, the same reference numerals will be used to refer to the same components. In the following description, various operating parameters and components are described for one constructed embodiment. These specific parameters and components are included as examples and are not meant to be limiting.

Figure 1:
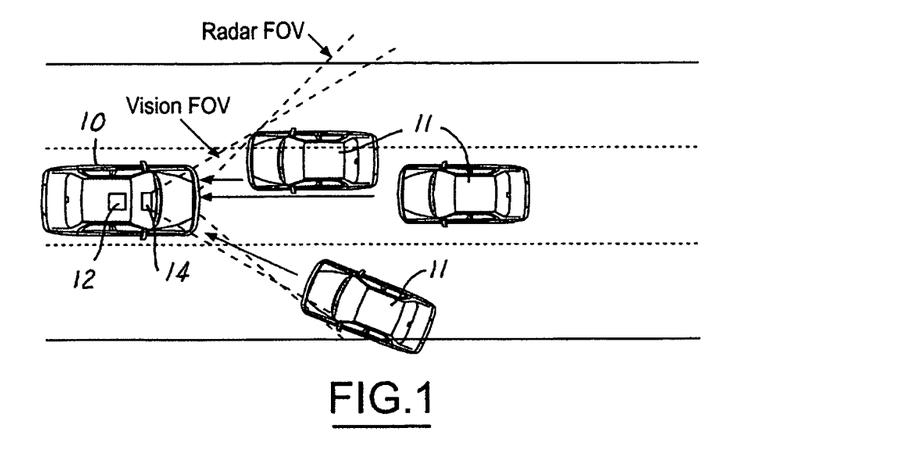
FIG. 1 is a schematic diagram of a vehicle including a vehicle restraint system in accordance with the present invention in an exemplary impact scenario.

Referring now to FIG. 1, there is shown a schematic diagram of a vehicle 10 including an actively adaptable vehicle restraint system 12 in accordance with the present invention in various collision scenarios with potential target vehicles 11. The actively adaptable vehicle restraint system 12 operates in coordination with the vehicle pre-crash sensing system 14. The pre-crash sensing system 14 generates object signal information in the presence of an object within its field-of-view. The pre-crash sensing system 14 may be comprised of one or more of a number of types of sensors including radar, lidar and vision systems. Vision systems may be comprised of one or more cameras, CCD, or CMOS-type devices. In the example shown in FIG. 1, vehicle 10 includes a vision system as part of its pre-crash sensing system, and the vision system field-of-view is shown. Alternatively, or in addition, radar or lidar may be used to detect an object within a detection zone as well. The radar system field-of-view is shown in the example of FIG. 1. If both a radar and vision-based system are used, one system may be used to detect an object and the other system may be used to confirm the presence of the object within the decision zone. Vision systems can also include more than one camera and incorporate triangulation techniques to determine the presence of an object and the distance from the vehicle as well as the object's size in terms of area, height, or width or combinations thereof. The pre-crash sensing system 14 may also include a receiver and a transponder. A transponder may be used to send data to other vehicles, and the receiver could be used to receive data from other vehicles. Such data could include vehicle location, braking capability, road conditions, time-to-impact and distance to collision. In the pre-crash sensing system shown in FIG. 1, the sensor field-of-view is configured to allow the detection of various collision scenarios such as a 90° frontal, offset, and oblique-type collisions. The pre-crash sensing system could also be adapted to detect side impact or rear collisions, as well.

In conventional vehicle airbag systems, airbags are deployed in response to collision events as detected by vehicle accelerometers. Pre-crash sensing systems can improve occupant safety by activating countermeasures before a collision event occurs. Thus, for example, countermeasure systems can be activated such as brake assist systems, motorized occupant seatbelt pretensioners, multi-stage airbags, or a suspension height adjustment system.

Figure 2:
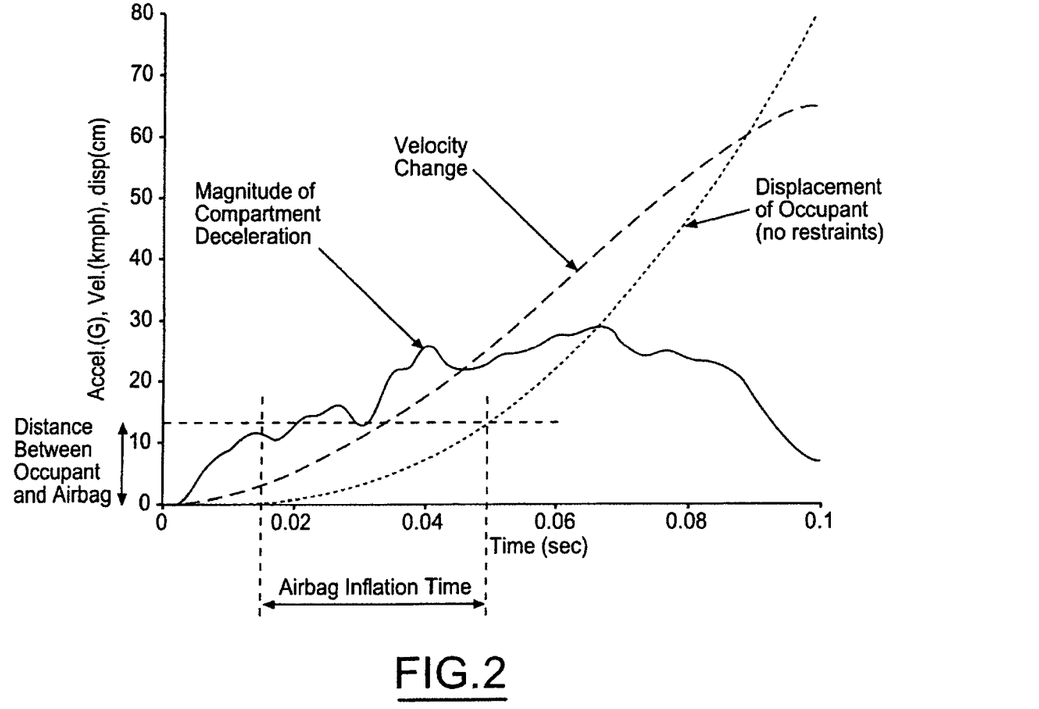
FIG. 2 shows a graph of an airbag restraint decision-making model based upon assumed occupant displacement.

FIG. 2 graphically illustrates an airbag restraint decision-making model based upon assumed occupant displacement. In this example, the airbag is assumed to be fully inflated by the time an unrestrained occupant has moved about twelve centimeters from the original position. The airbag deployment time is accordingly tuned to achieve this desired requirement. Such an approach, however, can be improved for collision events as occupant positions have the potential to vary considerably depending upon the type of collision event as well as the occupant characteristics.

Figure 3:
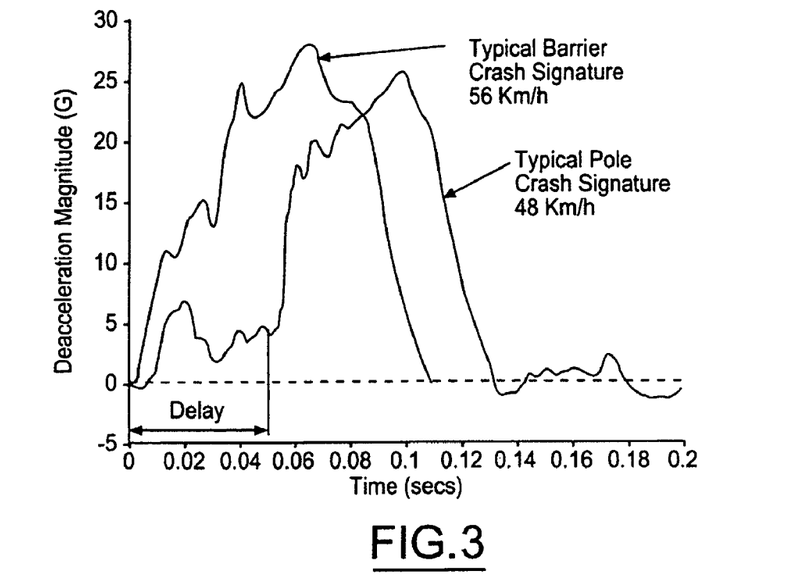
FIG. 3 shows a graph of decision-making compensation requirements based upon different collision signatures.

For example, FIG. 3 shows a graph wherein decision-making compensation is required based upon differing crash scenarios. Specifically, FIG. 3 illustrates a collision signature for a typical barrier crash at 56 km/h versus a typical pole crash signature at 48 km/h. The pole crash pulse shows the well-known characteristic delay during which time the impact is very concentrated and the crash energy at the onset of the collision event is directed more toward folding the impacted vehicle at the collision location. Such a localized collision event may mislead conventional airbag controllers into predicting a minor collision and not deploying the airbag or deploying the airbag at a non-optimal time. The occupant safety reference model (OSRM) described in more detail below, sets the desired safety performance parameters in terms of airbag levels and occupant ride-down in view of the remote sensor information such that systematic decisions regarding safety restraint deployment can be made.

Figure 4:
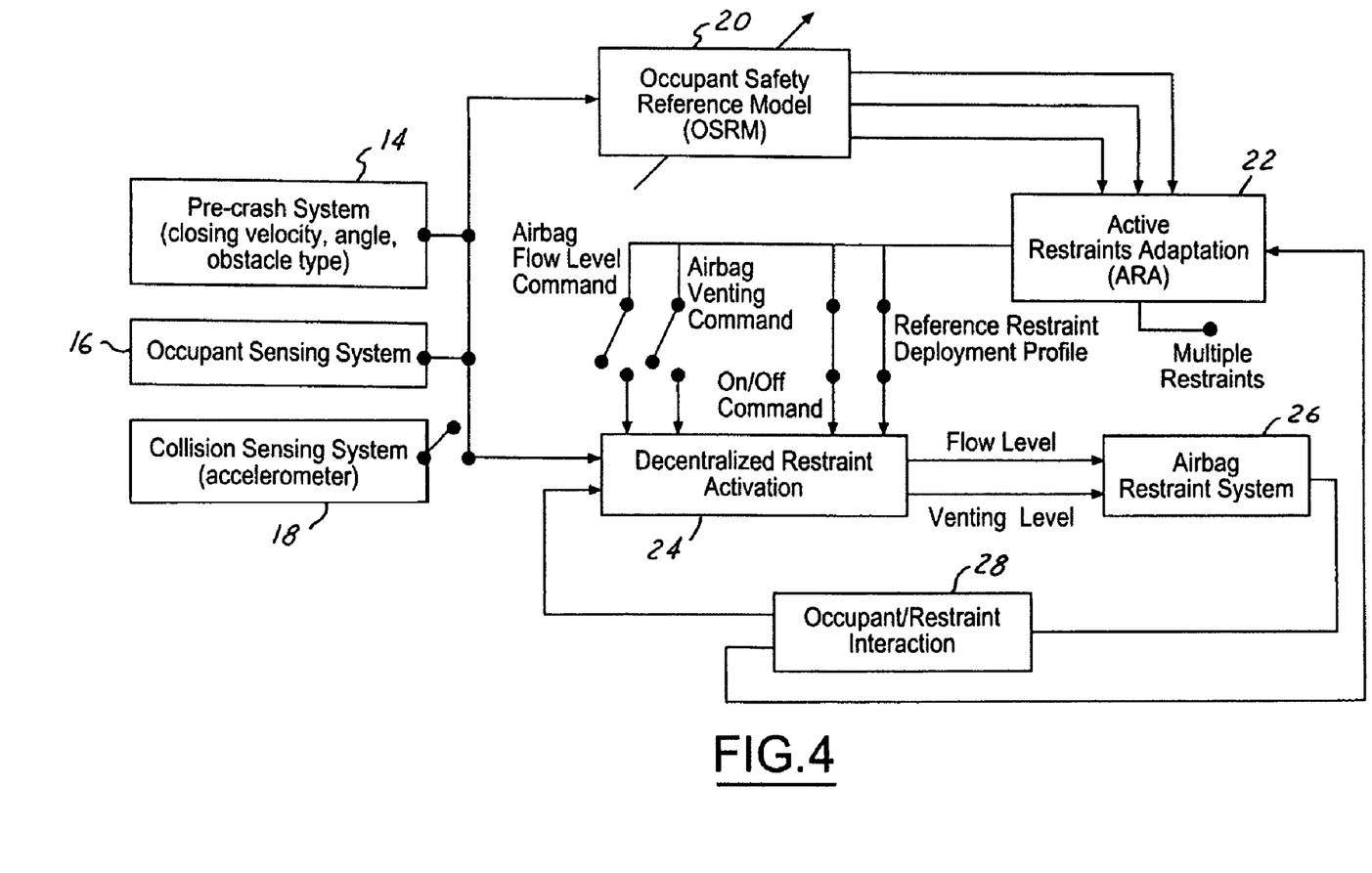
FIG. 4 shows a block diagram of a system for active adaptation of vehicle restraints in accordance with one embodiment of the present invention.

FIG. 4 shows a block diagram of a system for active adaptation of vehicle restraints 12 in accordance with one embodiment of the present invention. As mentioned above, the system 12 operates in cooperation with a pre-crash sensing system 14 providing collision obstacle data such as closing velocity, object position angle, and obstacle type; an occupant sensing system 16 providing occupant characteristics such as weight and position; and a collision-sensing system 18, typically an accelerometer-based system, for impact confirmation. The actively adapted vehicle restraint system 12 includes an Occupant Safety Reference Model (OSRM) controller 20 and an Active Restraint Adaptation (ARA) controller 22. The OSRM 20 utilizes information from the pre-crash sensing system to monitor the range, range-rate, potential impact time, and object-type information. The OSRM 20 also processes the occupant characteristics from the occupant sensing system 16 such as information provided by seat-weight sensors to determine the occupant weight, and an occupant proximity sensor to determine the occupant position relative to the steering wheel and/or instrument panel. The OSRM 20 then determines a desired safety performance profile and constructs a reference desired occupant ride-down profile. This information is then communicated to the ARA 22. The ARA controller 22 then sets the initial optimum targets for the restraint system and performs plausibility checks for sensor reliability. Thus, the OSRM, by setting the required safety performance specifications in terms of airbag levels and occupant ride-down, based on the remote sensor information, sets the framework for systematic decision-making. The ARA 22, however, is the primary controller within this architecture for robust occupant protection. As explained in more detail below, the ARA 22 determines if the crash is severe enough to deploy a restraint, sends airbag thresholds for deployment before or after a collision event, and sets targets for airbag flow rates and venting to achieve a desired occupant ride-down profile based upon real-time occupant positioning data. The ARA 22 can also incorporate deployment schemes for a multi-stage inflator for a frontal airbag, based upon the potential severity of the impact and the occupant characteristics.

The centralized OSRM 20 and ARA 22 architecture forms a central advisory system which feeds information to the local de-centralized restraint control system 24 which, in this example, is an airbag controller 24 controlling an airbag restraint system 26. The occupant ride-down may be monitored by an occupant-restraint interaction sensing system. The controller 24 intelligently manipulates the gas inflow rate, and the venting actuator system based upon the OSRM requirements as actively adapted by the ARA.

The pre-crash sensing system 14 may be comprised of one or more of a number of types of sensors including radar, lidar, vision systems, and receiver-transponder systems. Pre-crash sensing system 14 may also include vehicle dynamic information by way of a speed sensor, yaw rate sensor and a steering wheel angle sensor. The pre-crash sensing system may also be coupled to a GPS system for generating position signal information for the host vehicle. The pre-crash sensing system 14 provides data to the OSRM 20 such as the range, closing-velocity, obstacle position angle, and obstacle type detected. Although the pre-crash sensing system 14 is illustrated as a separate component from the OSRM 20, their functions may be incorporated into a single controller module having multi-level controller functions. Both the pre-crash sensing system 14 and the OSRM 20 as well as the ARA 22 may be microprocessor based such as a computer having a central processing unit, memory (RAM and/or ROM) and associated input and output busses. The pre-crash sensing system 14, the OSRM 20, and the ARA 22 may be application-specific integrated circuits or be formed of other logic devices known in the art. They also may form a portion of a central vehicle main control unit, a main safety controller, or may be stand-alone controllers as shown.

Occupant sensing system 16 employs occupant sensors which are used to determine various occupant characteristics such as occupant positioning within the vehicle interior, occupant size, shape, and weight, and which generate occupant signals indicative thereof. The occupant sensors 16 may also be of various styles. It may be in the form of radar sensors, lidar sensors, vision sensors, ultrasonic sensors, infrared sensors, pressure sensors, weight sensors, strain gauges, piezo-electric or piezo-resistive sensors, or may be in some other form known in the art. The occupant sensors 16 may also include remote and local accelerometers, seatbelt sensors, occupant position sensors, and seat track location sensors.

The collision sensing system 18 comprises contact sensors which are utilized to verify that a collision has occurred and to generate collision confirmation signals. The contact sensors may be in various locations along any extremity of the vehicle including the front, rear, and sides of the vehicle, or may even be more internally located within the vehicle. The contact sensors may be in the form of accelerometers, pressure sensors, piezo-electric or piezo-resistive sensors or may be in some other form as known in the art.

The restraint system shown is an airbag restraint system 26, but the present invention could be used with numerous passive safety systems which are actively adapted. Passive safety systems which are electronically augmented could include front airbags, side airbags or side curtain airbags. Side airbags may be in the form of seat integrated or door mounted airbags. Side curtain airbags could be in the form of pillar or roof-supported head restraints. The restraint system may also include other airbags or deployable restraints as well as seatbelt control, knee bolster control, head restraint control, pretensioner control, airbag control, motorized occupant seatbelt pretensioners, and other side or front impact passive safety system controls known in the art. The airbag restraint system 26 as shown, may include multiple stage inflators to control a flow rate and time delay signal for the passenger and driver airbags. Also, adaptive venting may also be provided having various flow rates and timed delays calculated by the OSRM 20 and adapted by the ARA 22. The airbag system may also include airbags with tethers which may be activated or deactivated based upon the output of the OSRM 20 or ARA 22.

The decision-making computations described in greater detail below which are incorporated into the OSRM 20 and the ARA 22 may be based upon fuzzy reasoning, pattern recognition systems with polynomial and neuro-network classifiers to determine crash conditions, or look-ups in a look-up table corresponding to the predicted collision conditions.

Figure 5:
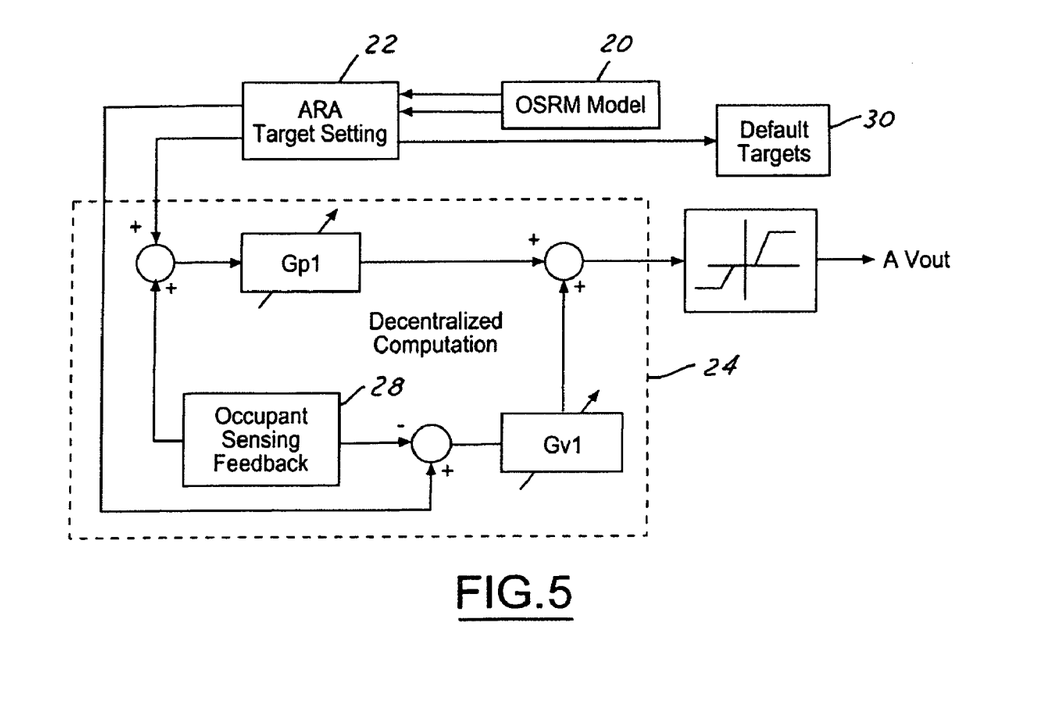
FIG. 5 shows a block diagram for occupant model reference adaptation for use within the present vehicle restraint system.

FIG. 5 shows a block diagram for occupant model reference adaptation detailing the interaction of the OSRM 20 and the ARA 22 with the decentralized restraint controller 24. As mentioned above, the OSRM 20 receives the pre-crash sensing information occupant position information and generates a model restraint activation profile. This information is then transmitted to the ARA 22. The ARA 22 determines if the collision event is significant enough to deploy a restraint, sets airbag thresholds for deployment before or after the collision event, and sets the target for flow rate and venting for the airbag restraint system 26. These default targets are then stored in the default target memory 30. The ARA 22 also deploys a scheme for deploying a multi-stage inflator for the front airbags based upon the potential severity of the impact event and the occupant characteristics. To improve the reliability and robustness of the system, threat assessment and computations for pre-arming or pre-impact deployment of the restraint system would occur only if the remote sensor signal-to-noise ratio is above a pre-determined threshold ($\lambda$).

$$\frac{R_{sig}}{R_{ns}} \geq \lambda \quad (1)$$

wherein $R_{sig}$ and $R_{ns}$ are the real time sensor signal and expected noise level, respectively. Improved deployment time is achieved by these pre-crash computations at the ARA controller 22. Deployment of the airbag, however, is activated after confirmation by the impact sensor 18 to improve system reliability. Deployment before impact is carried out for high confidence collision imminent pre-crash information. In the case of a frontal airbag restraint system, the restraint is deployed based upon the occupant characteristics including the occupant proximity to the steering wheel, and the predicted speed-dependent severity of the impact event. The frontal restraints deployment (FRD) status for deployment after impact is given by equation (2):

$$FRD = \begin{cases} 1 & \text{if } (|TC|_{pred} \leq RT + \alpha) \text{ and if } \gamma > \Delta_{thres} \\ & \text{where } \Delta_{thres} = K \frac{V_{cal}}{V_{rel}} \Delta_{cal} \\ 0 & \text{otherwise} \end{cases} \quad (2)$$

where TC is the time-to-collision, RT is the restraint deployment time, and $\alpha$ is a time-delay to account for sensor and microprocessor sampling rate synchronization. K is an adaptive gain-scheduled parameter for adjusting the accelerometer threshold, $V_{cal}$ the threshold velocity, $V_{rel}$ the relative velocity, $\Delta_{cal}$ the calibrated accelerometer constant, and $\gamma$ the contact sensor output. The initial airbag stage requirements and threshold requirements for venting are sent to the local decentralized controller 24 for activation of the airbag restraint 26 should a collision occur. The decentralized controller 24 monitors the occupant ride-down and manipulates the venting based on the OSRM model as adapted by the ARA 22 to achieve the desired restraints system deployment. For example, airbag venting decreases with increased severity, and increased occupant mass in order to assure that the stiffness of the airbag increases for enhanced protection. In this way, the present system actively adapts the vehicle restraints for improved performance and robustness.

In another example of actively adapting the vehicle restraints to enhance occupant safety, consider the occupant injury sensitivity to head position, for a simulated equivalent 56 km/h barrier impact crash, with a $50^{th}$ percentile crash test dummy. The likelihood of injury increases progressively for a larger head displacement through a range of displacements, in this example, from 10.2 cm up to 30.4 cm. Referring back to FIG. 2, consideration should be given to the distance between the occupant and the airbag in relation to the airbag inflation time. Thus, it is desirable to deploy the airbag at various times corresponding when the head of the unbelted occupant, after collision, would have moved through the range of displacement from approximately 10 to 30 cm to avoid larger head displacements and correspondingly increasing likelihood of injury. Referring again to FIG. 5, the occupant-restraint interactive sensing system 28 provides occupant-sensing feedback, from the appropriate contact sensors or from the occupant position sensors, to track the occupant position and ride-down during airbag deployment to allow the controller 24 to intelligently manipulate the gas inflow rate, and the venting actuator system as originally set by the ARA controller 22 based on the OSRM model and occupant position trajectory.

The modifying signal ($m_{out}$), for example, sent to the airbag venting actuator system to track the model from the OSRM 20 is given by equation (3):

$$m_{out}(n) = m_{out}(n-1) + G_{p1}[p(n)_{sens} - p_{mod}(n)] + G_{v1}[v(n)_{sens} - v_{mod}(n)] \quad (3)$$

where $G_{p1}$ is the occupant ride down position gain, $p_{sens}$ is the real-time sensed position relative to the steering wheel/instrument panel, and $p_{mod}$ is the model referenced position. $G_{v1}$ is the ride down velocity regulatory gain, $v_{sens}$ is the real-time sensed occupant velocity, and $v_{mod}$ is the model-referenced velocity. The change in the manipulating signal is set to zero to assure stability if a measure of error $occ_{err}$ is less or equal to a tolerance value $\mu$ as expressed in equation (4), $$occ_{err}=|[p(n)_{sens}-p_{mod}(n)]+K_2[v(n)_{sens}-v_{mod}(n)]|\leq\mu \quad (4)$$

where $K_2$ is an adjustable gain FIG. 5 shows the functional block diagram. The final output, $AV_{out}$ sent to the airbag venting system is given by equation (5):

$$AV_{out} = \begin{cases} max_{out} & \text{for } m_{out} > max_{out} \\ m_{out} & \text{for } min_{out} > |m_{out}| \leq max_{out} \\ -max_{out} & \text{for } m_{out} < -max_{out} \\ 0 & \text{for } |m_{out}| < min_{out} \end{cases} \quad (5)$$

Figure 6A:
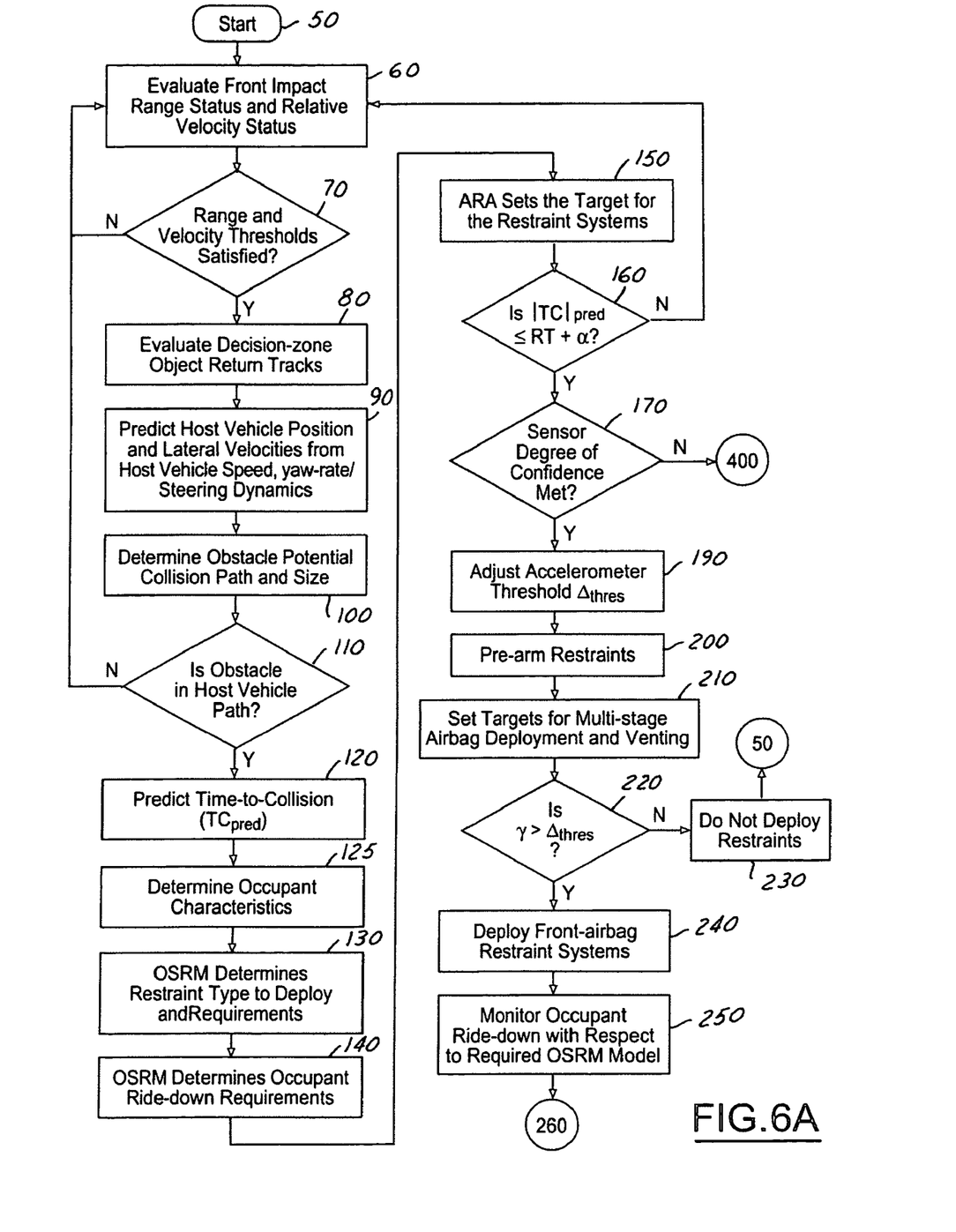
FIGS. 6A, 6B and 6C show logic flow diagrams of one method of implementing an active adaptation of vehicle restraints in accordance with an embodiment of the present invention.
Figure 6B:
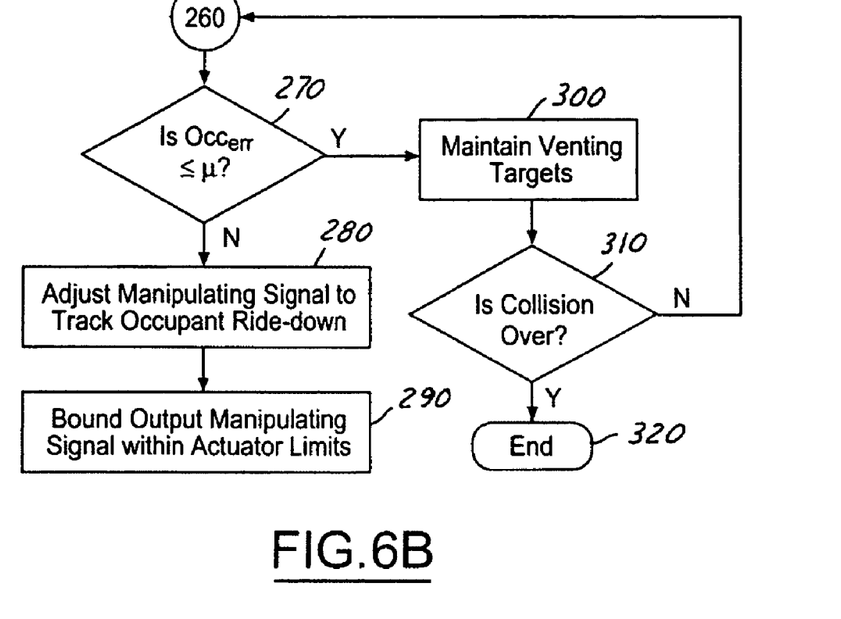
Figure 6C:
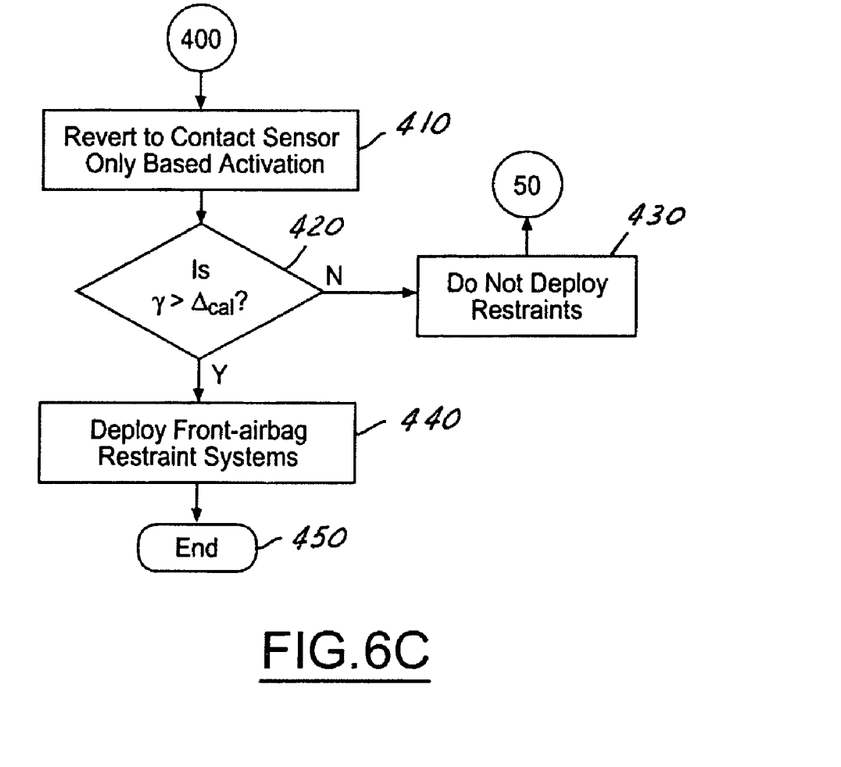

FIGS. 6A, 6B and 6C show logic flow diagrams of one method of implementing an active adaptation of vehicle restraints in accordance with one embodiment of the present invention. The logic routine starts in step 50. Steps 60-120 concern the pre-crash threat assessment. Thus, step 60 evaluates the front impact range status and relative velocity status of the host and target vehicles, and determines whether range and velocity thresholds are satisfied in step 70. Object tracking information is discerned in step 80 and host vehicle information is predicted in step 90. The obstacle type and path is determined in step 100, and a decision is made whether the obstacle is in the host vehicle path making collision likely in step 110. The predicted time to collision is therefore rendered in step 120. The occupant characteristics as determined from the occupant sensing system 16 are gathered in step 125. Information from the pre-crash sensing system 14 and occupant sensing system 16 is then fed to the OSRM 22 wherein, in step 130, models are referenced to determine the restraint type to deploy, and its requirements based upon the occupant characteristics and potential collision scenario. In step 140, the OSRM further determines a desired occupant ride-down requirement as processed by the occupant characteristics and potential collision scenario. In step 150, the ARA 22 sets the targets for the restraint system deployment based upon the OSRM parameters and the restraint deployment time (RT) and monitors the sensory input degree of confidence. If the predicted time to collision is within the restraint deployment time and a time delay to account for sensor and microprocessor sample rate synchronization, as determined in step 160, the logic continues to step 170. In step 170, the sensor degree of confidence is analyzed.

If the sensor degree of confidence is not met in step 170, the logic continues to step 410 wherein the method reverts to contact sensor-based activation. That is, airbag or other restraint system deployment will only occur conventionally in response to an impact confirmation from the collision sensing system 18. If the contact sensor output is not satisfied in step 420, then the restraints are not deployed as shown in step 430. Otherwise, the restraints are deployed in step 440.

Returning back to step 170, if the sensor degree of confidence is met, the logic continues to step 190, wherein the accelerometer threshold is adjusted in accordance with equation (2) above. The restraints are pre-armed in step 200 and the initial airbag stage requirements and threshold requirements or venting are sent to the local decentralized controller 24 for activation of the airbag restraint should a collision occur as shown in step 210. If a collision is not confirmed in step 220, then the restraints are not deployed as shown in step 230. Otherwise, the front airbag restraint system is deployed in step 240 and the occupant ride-down characteristics are monitored and compared to the OSRM model in step 250.

Steps 250-310 logically illustrate the feedback routine described with respect to FIG. 5 above. That is, in step 270, for an insignificant change in occupant position with respect to the desired occupant position model, the model venting targets are maintained in step 300 for the duration of the collision in step 310. Otherwise, if the occupant position sensing feedback deviates from a desired response as determined in step 270, the manipulating signal is adjusted to correct the occupant ride-down in step 280 within the actuator limits as shown in step 290. The occupant-restraint interaction is continuously monitored until the collision event ends.

Similar deployable safety systems could be monitored in the same way. Thus, a model deployment scheme is provided based upon pre-crash information for deployment of safety restraints either before or after a collision. The model scheme is then actively modified, if appropriate, during a crash event based upon the occupant-safety system interaction.

Accordingly, while particular embodiments of the invention have been shown and described, numerous variations and alternative embodiments will occur to those skilled in the art. Accordingly, it is intended that the invention be limited only in terms of the appended claims.

What is claimed is:

1. A vehicle crash safety system for an automotive vehicle comprising:
    a pre-crash sensing system generating an object threat assessment and vehicle dynamics data;
    an occupant sensing system generating occupant characteristic data;
    an occupant safety reference model (OSRM) controller in electronic communication with said pre-crash sensing system and said occupant sensing system, said OSRM controller generating a reference safety restraint deployment profile as a function of said object threat assessment, vehicle dynamics data and occupant characteristic data;
    an active restraint adaptation (ARA) controller in operative communication with said OSRM controller and a decentralized restraint controller, said ARA controller programmed to send restraint deployment targets, and said reference safety restraint deployment profile to the decentralized restraint controller, and modify input signals to the decentralized controller as a function of real-time occupant-safety system interaction;
    a restraint system under the control of the decentralized restraint controller, said restraint controller in operative communication with said ARA controller, said restraint controller programmed to operate said restraint system based on the targets from the ARA controller and the reference safety restraint deployment profile as a function of real-time occupant-safety system interaction.

2. A system as recited in claim 1 comprising a collision sensing system for confirming a crash event.

3. A system as recited in claim 1 wherein said restraint system comprises an airbag system.

4. A system as recited in claim 3 wherein said airbag system comprises a multi-stage airbag system with variable venting.

5. A system as recited in claim 1 wherein said OSRM controller and ARA controller comprise a centralized controller architecture separate from said decentralized restraint controller.

6. A system as recited in claim 5 wherein said reference safety restraint deployment profile comprises a desired occupant ride-down profile.

7. A system as recited in claim 1 wherein said occupant characteristic data includes occupant weight, position and velocity within the vehicle.

8. A system as recited in claim 7 wherein said occupant characteristic data includes seat position and incline data, seat belt usage indicator, and an occupant classifier.

9. A system as recited in claim 1 wherein said object threat assessment data includes closing velocity, approach angle and obstacle type, and the predicted velocity-dependent severity.

10. A system as recited in claim 1 wherein said vehicle dynamics data includes vehicle speed, yaw rate and steering angle.

11. A system as recited in claim 1 wherein said restraint system comprises at least one of a driver airbag system, a passenger airbag system, a side airbag system, a curtain airbag system, a seatbelt system, a deployable knee-bolster system, a deployable lower extremity protection system, a deployable steering system, or an occupant anti-submaring system.

12. A method for operating a vehicle crash safety system for an automotive vehicle comprising:
   generating a pre-crash threat assessment signal and vehicle dynamics data from a pre-crash sensing system;
   generating occupant characteristic data from an occupant sensing system;
   generating a reference safety restraint deployment profile as a function of said pre-crash threat assessment signal, vehicle dynamics data and occupant characteristic data;
   communicating said reference safety restraint deployment profile to a restraint system under the control of a respective restraint controller, said restraint controller adapted to operate said restraint system as a function of said reference safety restraint deployment profile; and
   in response to a crash event, tracking said reference safety restraint deployment profile during said crash event as a function of real-time occupant-restraint system interaction.

13. A method as recited in claim 12 wherein said restraint system comprises a multi-stage airbag with variable venting, and wherein the step of modifying includes monitoring, during said crash event, an occupant head position, and relative velocity with respect to said airbag and vehicle interior, and in response to said occupant head position, adaptively controlling at least one of an airbag inflation rate or venting rate.

14. A method as recited in claim 12 wherein said restraint comprises an airbag and said reference safety restraint deployment profile comprises a desired occupant initial position and ride-down profile.

15. A method as recited in claim 12 comprising determining pre-crash sensing confidence thresholds, and if confidence thresholds are met, deploying the restraint system before impact or pre-arming, otherwise, deploying said safety restraint only in response to a confirmed collision event.

16. A method as recited in claim 12 wherein said restraint system comprises at least one of a driver airbag system, a passenger airbag system, a side airbag system, a curtain airbag system, a seatbelt system, a deployable knee-bolster system, a deployable lower extremity protection system, a deployable steering system, or an occupant anti-submaring system.

17. A method as recited in claim 12 wherein said occupant characteristic data includes at least one of occupant weight, occupant position within the vehicle, seat position and incline data, seat belt usage indicator, and an occupant classifier.

18. A method as recited in claim 12 wherein the step of communicating includes pre-crash deployment or adjusting the restraint deployment thresholds of said restraint in accordance with said reference safety restraint deployment profile.

19. A vehicle crash safety system for an automotive vehicle comprising:
   a pre-crash sensing system generating an object threat assessment;
   an occupant sensing system generating occupant characteristic data;
   an occupant safety reference model (OSRM) controller in electronic communication with said pre-crash sensing system and said occupant sensing system, said OSRM controller generating a reference occupant ride-down profile as a function of said object threat assessment and occupant characteristic data;
   a collision sensing system for signaling a crash event;
   an active restraint adaptation (ARA) controller in operative communication with said OSRM controller and a decentralized restraint controller, said ARA controller programmed to send restraint deployment targets and said reference safety restraint deployment profile to the decentralized restraint controller, and modify input signals to the decentralized controller as a function of real-time occupant-safety system interaction;
   a multi-stage, variable venting airbag system under the control of the decentralized restraint controller, said decentralized restraint controller remotely located from and in operative communication with said ARA controller, said restraint controller programmed to operate said restraint system before or after impact based on said targets from the ARA, and the reference safety restraint deployment profile as a function of real-time occupant-restraint system interaction.

20. A system as recited in claim 19 wherein said restraint controller tracks and modifies within predefined occupant state and actuator constraints, at least one of airbag deployment flow rate or venting rate, during said crash event, based on detected occupant head position or occupant relative velocity with respect to said airbag and vehicle interior.

* * * * *